United States Patent
Baláz et al.

(10) Patent No.: US 12,044,379 B2
(45) Date of Patent: Jul. 23, 2024

(54) REFLECTOR UNIT

(71) Applicant: ZKW Group GmbH, Wieselburg (AT)

(72) Inventors: Felip Baláz, Partizánske (SK); Andrej Zubaj, Krnca (SK)

(73) Assignee: ZKW Group GmbH, Wieselburg (AT)

( * ) Notice: Subject to any disclaimer, the term of this patent is extended or adjusted under 35 U.S.C. 154(b) by 536 days.

(21) Appl. No.: 17/421,193

(22) PCT Filed: Dec. 20, 2019

(86) PCT No.: PCT/EP2019/086631
§ 371 (c)(1),
(2) Date: Jul. 7, 2021

(87) PCT Pub. No.: WO2020/144055
PCT Pub. Date: Jul. 16, 2020

(65) Prior Publication Data
US 2022/0057066 A1 Feb. 24, 2022

(30) Foreign Application Priority Data

Jan. 9, 2019 (EP) .................................... 19150977

(51) Int. Cl.
*G02B 26/08* (2006.01)
*B60Q 1/068* (2006.01)
(Continued)

(52) U.S. Cl.
CPC ............ *F21S 41/67* (2018.01); *B60Q 1/0683* (2013.01); *F21S 41/147* (2018.01); *F21S 41/336* (2018.01);
(Continued)

(58) Field of Classification Search
CPC ........ F21S 41/67; F21S 41/147; F21S 41/336; F21S 41/39; F21S 41/50; B60Q 1/0683; B60Q 2200/34; F21V 7/16; G02B 26/08
See application file for complete search history.

(56) References Cited

U.S. PATENT DOCUMENTS 9,328,902 B2 * 5/2016 Eckert .................... F21V 7/048
2008/0192498 A1   8/2008 Suita
2017/0151901 A1   6/2017 Sazuka

FOREIGN PATENT DOCUMENTS

CN  107831585 A  3/2018
DE     1630360 A1  8/1971
(Continued)

OTHER PUBLICATIONS

Office Action for Chinese Patent Application No. 201980088322.7, dated Jul. 26, 2023 (10 Pages).
(Continued)

*Primary Examiner* — Euncha P Cherry
(74) *Attorney, Agent, or Firm* — Eversheds Sutherland (US) LLP

(57) ABSTRACT

Reflector unit (1) comprising a single pieced reflector (2), said reflector (2) being obtained by way of a molding process, and a frame structure (3) for supporting the single pieced reflector (2), wherein the reflector (2) comprises at least two reflecting chambers (2a) for reflecting light from a light source (8), wherein the at least two chambers (2a) are being spaced from another, and wherein the reflector (2) is firmly and essentially non-adjustably connected to the frame structure (3) by at least two connecting means (4), wherein the reflector (2) is non-movable with regard to the frame structure (3) along the portions of the connecting means (4), wherein the frame structure (3) comprises at least one adjusting screw (5a, 5b) being connected with an engaging portion (7a, 7b) of the frame structure (3) and an engaging
(Continued)

portion (6*a*, 6*b*) of the reflector (2), wherein the engaging portions (6*a*, 6*b*, 7*a*, 7*b*) are configured to allow rotational movement of the respective adjusting screw (5*a*, 5*b*), and wherein rotational movement of the at least one adjusting screw (5*a*, 5*b*) translates into linear movement of the respective engaging portions (6*a* and 7*a*, 6*b* and 7*b*) with respect to one another for adjusting the distance between the respective engaging portions (6*a*, 6*b*) of the reflector (2) and the respective engaging portion (7*a*, 7*b*) of the frame structure (3) and thus bending the reflector (2) with regard to the firm portions of the connecting means (4).

17 Claims, 2 Drawing Sheets

(51) Int. Cl.
*F21S 41/147* (2018.01)
*F21S 41/33* (2018.01)
*F21S 41/39* (2018.01)
*F21S 41/50* (2018.01)
*F21S 41/67* (2018.01)
*F21V 7/16* (2006.01)

(52) U.S. Cl.
CPC ............... *F21S 41/39* (2018.01); *F21S 41/50* (2018.01); *F21V 7/16* (2013.01); *B60Q 2200/34* (2013.01)

(56) References Cited

FOREIGN PATENT DOCUMENTS

| | | |
|---|---|---|
| DE | 102016106760 A1 | 10/2017 |
| EP | 0262586 A1 | 4/1988 |
| EP | 2618046 A1 | 7/2013 |
| FR | 917403 A | 1/1947 |
| GB | 600442 A | 4/1948 |
| GB | 1216965 A | 12/1970 |
| JP | 2003100117 A | 4/2003 |
| JP | 2005-235520 A | 9/2005 |
| JP | 2015046235 A | 3/2015 |
| JP | 2016007911 A | 1/2016 |
| JP | 2018032510 A | 3/2018 |
| WO | 2005025934 A1 | 3/2005 |

OTHER PUBLICATIONS

JP Patent Application No. 2021-540034 Office Action dated Sep. 20, 2022.
International Search Report for PCT/EP2019/086631, dated Feb. 19, 2020 (15 pages).
Search Report for European Patent Application No. 19150977.7 dated May 14, 2019 (9 pages).

* cited by examiner

REFLECTOR UNIT

FIELD OF THE INVENTION AND DESCRIPTION OF PRIOR ART

The present invention relates to a reflector unit comprising a single pieced reflector, said reflector being obtained by way of a molding process, and a frame structure for supporting the single pieced reflector, wherein the reflector comprises at least two reflecting chambers for reflecting light from a light source, wherein the at least two chambers are being spaced from another, and wherein the reflector is firmly and essentially non-adjustably connected to the frame structure by at least two (preferably a number of) connecting means, wherein the reflector is non-movable with regard to the frame structure along the portions of the connecting means.

During molding processes is known that deformations of molded parts will occur to some extent. In most applications these deformations are not critical. However, when dealing with light relevant components like reflectors deformations have a detrimental effect for the light distribution of the reflector. In order to minimize the impact and the degree of deformation it was common to split a reflector having a number of reflecting chambers into separate pieces and to mount these pieces separately. However, separate mounting requires alignment of the separate pieces with regard to each other as well as corresponding connection means. Thus, such reflector units are expensive and prone to misalignment.

SUMMARY OF THE INVENTION

It is an object of the invention to overcome the drawbacks of the prior art. This problem is solved by providing a reflector unit according to the above mentioned kind, wherein the frame structure comprises at least one adjusting screw being connected with an engaging portion of the frame structure and an engaging portion of the reflector, wherein the engaging portions are configured to allow rotational movement of the respective adjusting screw, and wherein rotational movement of the at least one adjusting screw translates into linear (relative) movement of the respective engaging portions with respect to one another for adjusting the distance between the respective engaging portions of the reflector and the respective engaging portion of the frame structure and thus bending the reflector with regard to the firm portions of the connecting means.

Consequently, existing deformation of the reflector can be removed by adjusting the adjusting screw. Therefore, the molding process does not have to be amended as such. The invention enables to use large single piece reflectors having two or more reflecting chambers while maintaining accurate reflector positioning and adjustment.

The term "single pieced reflector" is used for a reflector that is molded in one piece and does not consist of separately molded pieces that are connected together on a later stage. Injection molding is particularly suited for molding the reflector. The reflector unit can be configured as a light module or part of a light module, wherein the frame structure serves as a mounting portion. This frame structure can be tiltably fixed in a housing—for instance in order to adjust the light distribution of the module or the module itself. As such, during the assembly process, the frame structure can be inserted with the intention to be removeable from a housing of a vehicle head light. Thus, the frame structure is not part of a vehicle headlight housing itself. The term "the reflector is firmly and essentially non-adjustably connected to the frame structure" means that the reflector is not in its entirety tiltable or alike with regard to the frame structure (for instance as part of a light function). The reflector is intended to be firmly connected to the frame structure. However, as described above, the molding process of the reflector can result in deformations. In order to compensate these deformations, the reflector can be partially bent with regard to the frame structure by way of the adjusting screws, which could be also referred to as "bending screws" since these screws do not serve for traditional adjustment methods of the reflector (traditional adjustment methods would comprise for instance rotational or linear movement of the entire reflector with regard to the frame structure). As such, applying the adjusting screws does not alter the firm fixation of the reflector regarding the frame structure, but simply allows to locally bend the reflector in order to compensate for deformations than can result from the molding process. Consequently, the reflector is "essentially non-adjustably" connected to the frame structure.

Preferably, the connecting means are mounting screws for mounting the reflector onto the frame structure. In particular the reflector unit can comprise at least three, preferably precisely four mounting screws, arranged substantially evenly along an outer circumference of the frame structure.

Advantageously, the reflector unit comprises at least two, in particular precisely two adjusting screws (i.e. bending screws), wherein the single pieced reflector and the frame structure comprise respective engaging portions for engaging with each adjusting screw. Basically, the number of adjusting screws can be chosen in dependence of the size of the reflector, the expected deformation, and/or the number of reflecting chambers. For instance, having only one adjusting screw could be sufficient for reflectors having only two chambers or for reflectors having the reflecting chambers seated around circumference. For reflectors having three or more reflecting chambers that are aligned side by side (not around a circle), two or more adjusting screws can be beneficial. Preferably, the engaging portions can be positioned off-centre with regard to the centre of the frame structure, preferably on opposing sides of the frame structure. The term "opposing sides" means that—for instance—if one screw is on the upper part, the other one is on a lower part, if one screw is on the left side, the other one is on the right side, etc.

Preferably, the at least one adjusting screw comprises a cylindrical guiding section that is configured to rotate within the engaging portion of the reflector and wherein the cylindrical guiding section is bounded on both sides by broadened sections, wherein the at least one engaging portion of the reflector is held in between the broadened sections when engaging with the adjusting screw in an engaging position, wherein in the engaging position the broadened sections block linear movement of the adjusting screw along the longitudinal axis of the cylindrical guiding section with regard to the corresponding engaging portion of the reflector, and wherein the at least one adjusting screw further comprises a threaded section engaging with the engaging portion of the frame structure for causing linear movement with regard to the frame structure as a result of rotational motion of the adjusting screw, thus causing bending of the reflector with regard to the frame structure. Such an adjusting screw can also be referred to as a "ball screw".

In order to allow easy adjustment of the adjusting screw the at least one adjusting screw can be accessible and adjustable from the front side of the reflector. By way of an alternative the at least one adjusting screw can be accessible and adjustable from the back side of the frame structure.

Preferably, the reflector comprises three or more reflecting chambers.

In particular, the reflector can comprise five chambers, wherein four outer chambers are set on corners of a virtual rectangle or circle, and wherein one chamber in the centre between the outer chambers.

The adjusting screw can be adjusted in a manner that allows that the light exit surface of each reflecting chamber is arranged essentially within a single surface.

The reflector unit can further comprises a cover covering the space between the chambers.

Preferably, the reflector can be made of plastic. In particular, the surface of the plastic can be metallized in order to reflect light.

The invention further relates to a vehicle headlamp comprising a reflector unit according to the invention and at least two light source, in particular LED-light sources, wherein at least one light source is associated with each reflecting chamber for emitting light into the respective reflecting chamber.

Preferably, each light source is attached to the respective reflecting chamber. This means that the position of the light source is fixed with regard to the position of the reflecting chamber. Therefore, by bending the reflector by adjusting with the adjusting screws, the position of the light sources with regard to the respective reflecting chambers is not affected and the light distribution only changes due to the change of position (movement of a reflecting chamber), orientation and/or slightly bending of the shape of the reflecting chamber and not due to a misalignment with regard to the focal point of the light source. Preferably, the light sources can be LED-light sources.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

In the following figures identical reference signs refer to identical features unless expressly depicted otherwise.

Figure 1:
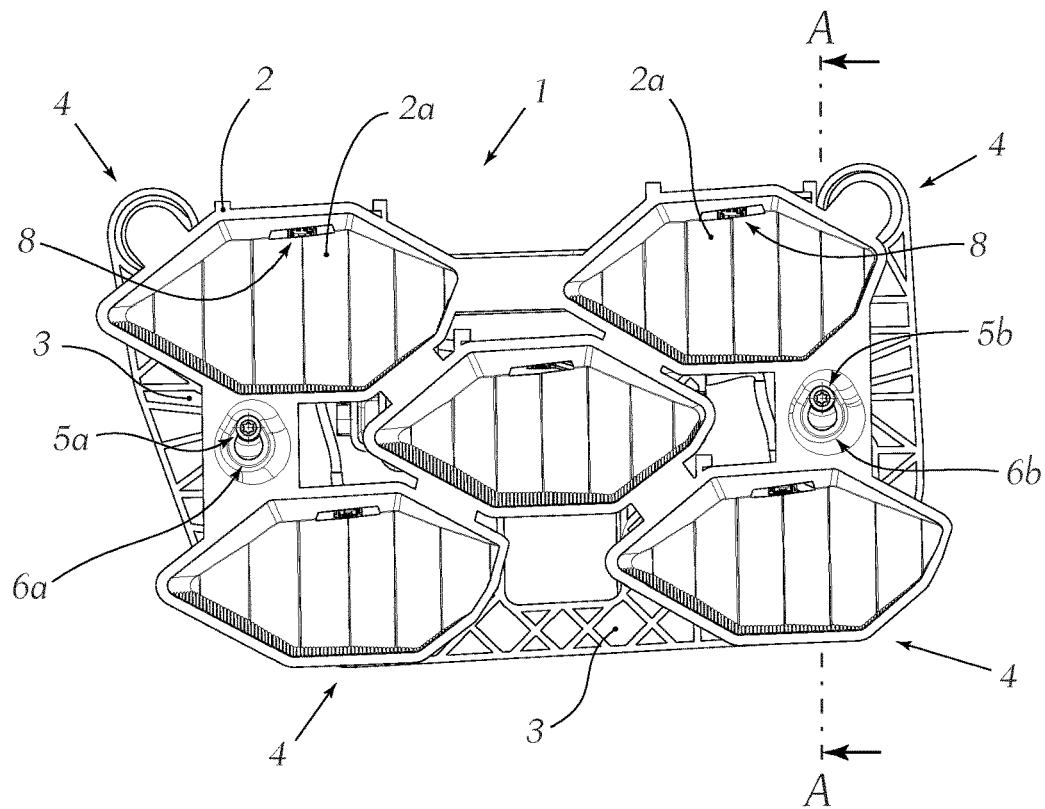
FIG. 1 a perspective view of a front side of a reflector unit according to the invention, FIG. 2 a perspective view of the back side of the reflector of FIG. 1, FIG. 3 a cross-section of the reflector unit of the section A-A of FIG. 1, FIG. 4 an exemplary embodiment of an adjusting screw, and FIG. 5 a front view of the reflector unit according to FIGS. 1 to 3 including a cover.

FIG. 1 shows a perspective view of a front side of a reflector unit 1 according to the invention. The reflector unit 1 comprises a single pieced reflector 2, said reflector 2 being obtained by way of a molding process, preferably by injection molding, and a frame structure 3 for supporting the single pieced reflector 2. In this embodiment of the invention, the reflector 2 comprises five reflecting chambers 2a for reflecting light from a light sources 8, preferably a LED light sources, wherein the at least two chambers 2a are being spaced from another, and wherein the reflector 2 is firmly and essentially non-adjustably connected to the frame structure 3 by a four connecting means 4, wherein the reflector 2 is non-movable with regard to the frame structure 3 along the portions of the connecting means 4.

In order to adjust the reflector 2 with regard to the frame structure 3, the frame structure 3 comprises in the shown embodiment for instance two adjusting screws 5a and 5b, each being connected with a respective engaging portion 7a and 7b of the frame structure 3 and an engaging portion 6a and 6b of the reflector 2. The engaging portions 6a, 6b, 7a and 7b are configured to allow rotational movement of the respective adjusting screw 5a and 5b. Furthermore, the engaging portions 6a, 6b, 7a and 7b are designed to translate rotational movement of the adjusting screw 5a and/or 5b into linear movement of the respective engaging portions (6a and 7a and/or 6b and 7b) with respect to one another for adjusting the distance between the respective engaging portions 6a and 6b of the reflector 2 and the respective engaging portion 7a and 7b of the frame structure 3 and thus bending the reflector 2 with regard to the firm portions of the connecting means 4.

Figure 2:
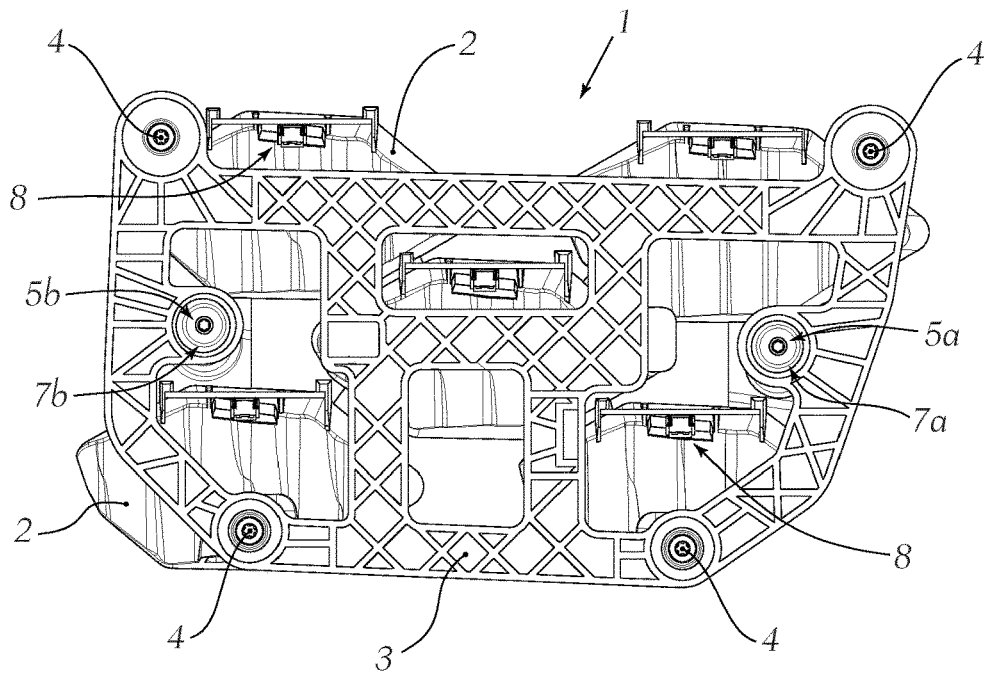

As can be seen in FIG. 2, the reflector unit 2 is firmly fixed to the frame structure 3 at four different points by way of connecting means 4 that are embodied as mounting screws. These mounting screws are evenly arranged on an outer circumference of the frame structure 3.

The adjusting screws 5a and 5b are arranged distant to one another between the connecting means 4 in order to allow adjustment by bending the reflector 2 in accordance with an adjusting position of the adjusting screws 5a and 5b. This adjusting position can be determined by rotational motion of the respective adjusting screw 5a and/or 5b (see also FIG. 3).

Figure 4:
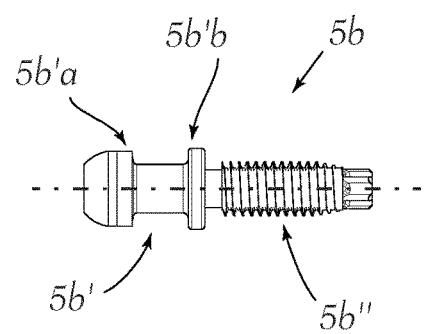

FIG. 4 shows an exemplary embodiment of an adjusting screw 5b. Therein, the adjusting screw 5b comprises a cylindrical guiding section 5b' that is configured to rotate within the engaging portion 6b of the reflector 2. The cylindrical guiding section 5b' is bounded on both sides by broadened sections 5b'a, 5b'b, wherein the engaging portion 6b of the reflector 2 is held in between the broadened sections 5b'a and 5b'b when engaging with the adjusting screw 5b in an engaging position. In the engaging position the broadened sections 5b'a and 5b'b block linear movement of the adjusting screw 5b along the longitudinal axis of the cylindrical guiding section 5b' with regard to the corresponding engaging portion 6b of the reflector 2. The adjusting screw 5b further comprises a threaded section 5b" engaging with the engaging portion 7b of the frame structure 3 for causing linear movement with regard to the frame structure 3 as a result of rotational motion of the adjusting screw 5b, thus causing bending of the reflector 2 with regard to the frame structure 3. In order to connect an adjusting screw 5a, 5b with the engaging portion 6a, 6b of the reflector 2, the engaging portion 6a, 6b has a recess (for instance a tear drop shaped recess), which narrows from a wider section towards a narrow section (see FIG. 1). The adjusting screw 5a, 5b can be inserted into the corresponding wide section and then moved towards the narrow section and as such being held firmly in place when being clamped in the narrow section while maintaining the ability to rotate along its longitudinal axis.

Figure 3:
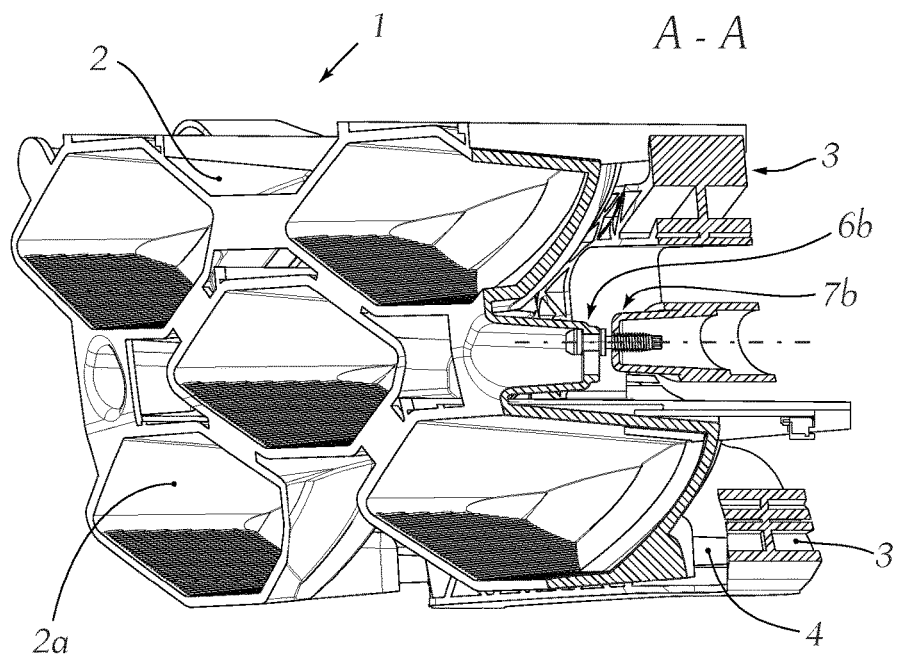

As can be seen from FIG. 1 and FIG. 3, the adjusting screws 5a and 5b are accessible and adjustable from the front side of the reflector 2. In this embodiment, the reflector 2 comprises five chambers 2a, wherein four outer chambers are arranged on the corners of a virtual rectangle, and wherein one chamber is arranged in the centre between the outer chambers. Of course, the number and the arrangement of the chambers 2a can vary and a person skilled in the art will be able to adjust and/or amend the features of this exemplary embodiment according to individual requirements.

Figure 5:
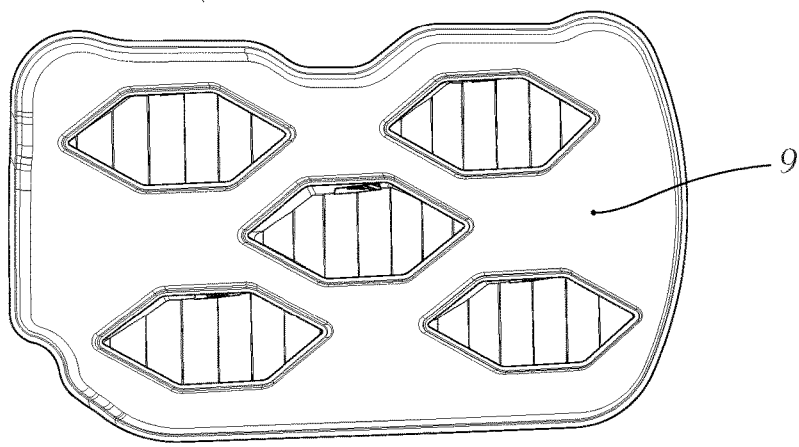

FIG. 5 shows a front view of the reflector unit 1 according to FIGS. 1 to 3, wherein the reflector unit 1 includes a cover 9. The cover 9 covers the space between the chambers 2a and as such also the connection means 4 as well as the adjusting screws 5a and 5b. Preferably, the reflector 2 can be made of plastic having a metallized surface in order to reflect light.

The invention claimed is:

1. A reflector unit (1) comprising:
a single pieced reflector (2), said reflector (2) being obtained by way of a molding process; and
a frame structure (3) for supporting the single pieced reflector (2),
wherein the reflector (2) comprises at least two reflecting chambers (2a) for reflecting light from a light source (8), wherein the at least two chambers (2a) are being spaced from another, and wherein the reflector (2) is firmly and essentially non-adjustably connected to the frame structure (3) by at least two connecting means (4), wherein the reflector (2) is non-movable with regard to the frame structure (3) along the portions of the connecting means (4),
wherein the frame structure (3) comprises at least one adjusting screw (5a, 5b) being connected with an engaging portion (7a, 7b) of the frame structure (3) and an engaging portion (6a, 6b) of the reflector (2), wherein the engaging portions (6a, 6b, 7a, 7b) are configured to allow rotational movement of the respective adjusting screw (5a, 5b), and wherein rotational movement of the at least one adjusting screw (5a, 5b) translates into linear movement of the respective engaging portions (6a and 7a, 6b and 7b) with respect to one another for adjusting the distance between the respective engaging portions (6a, 6b) of the reflector (2) and the respective engaging portion (7a, 7b) of the frame structure (3) and thus bending the reflector (2) with regard to the firm portions of the connecting means (4), and
wherein the at least one adjusting screw (5b) comprises a cylindrical guiding section (5b') that is configured to rotate within the engaging portion (6b) of the reflector (2) and wherein the cylindrical guiding section (5b') is limited on both sides by broadened sections (5b'a, 5b'b), wherein the engaging portion (6b) of the reflector (2) is held in between the broadened sections (5b'a, 5b'b) when engaging with the adjusting screw (5b) in an engaging position, wherein in the engaging position the broadened sections (5b'a, 5b'b) block linear movement of the adjusting screw (5b) along the longitudinal axis of the cylindrical guiding section (5b') with regard to the corresponding engaging portion (6b) of the reflector (2), and wherein the at least one adjusting screw (5b) further comprises a threaded section (5b") engaging with the engaging portion (7b) of the frame structure (3) for causing linear movement with regard to the frame structure (3) as a result of rotational motion of the adjusting screw (5b), thus causing bending of the reflector (2) with regard to the frame structure (3).

2. The reflector unit (1) according to claim 1, wherein the connecting means (4) are mounting screws for mounting the reflector (2) onto the frame structure (3).

3. The reflector unit (1) according to claim 2, wherein the reflector unit (1) comprises at least three mounting screws (4), arranged substantially evenly along an outer circumference of the frame structure (3).

4. The reflector unit (1) according to claim 1, wherein the reflector unit (1) comprises at least two adjusting screws (5a, 5b), wherein the single pieced reflector (2) and the frame structure (3) comprise respective engaging portions (6a, 6b, 7a, 7b) for engaging with each adjusting screw (5a, 5b).

5. The reflector unit (1) according to claim 4, wherein the engaging portions (6a, 6b, 7a, 7b) are positioned off-centre with regard to the centre of the frame structure (3).

6. The reflector unit (1) according to claim 1, wherein the at least one adjusting screw (5a, 5b) is accessible and adjustable from the front side of the reflector (2).

7. The reflector unit (1) according to claim 1, wherein the at least one adjusting screw (5a, 5b) is accessible and adjustable from the back side of the frame structure (3).

8. The reflector unit (1) according to claim 1, wherein the reflector (2) comprises three or more chambers (2a).

9. The reflector unit (1) according to claim 1, wherein the reflector (2) comprises five chambers (2a), wherein four outer chambers are on the corners of a virtual rectangle, and wherein one chamber is in the centre between the outer chambers.

10. The reflector unit (1) according to claim 1, wherein the reflector unit (1) further comprises a cover (9) covering the space between the chambers (2a).

11. The reflector unit (1) according to claim 1, wherein the reflector (2) is made of plastic.

12. The reflector unit (1) according to claim 11, wherein the surface of the plastic is metallized in order to reflect light.

13. A vehicle headlamp comprising:
a reflector unit (1) according to claim 1; and
at least two LED light sources (8),
wherein at least one of the at least two LED light sources (8) is associated with each reflecting chamber (2a) for emitting light into the respective reflecting chamber (2a).

14. A vehicle headlamp according to claim 13, wherein each light source (8) is attached to the respective reflecting chamber (2a).

15. The reflector unit (1) according to claim 3, wherein the reflector unit (1) comprises precisely four of the mounting screws (4).

16. The reflector unit (1) according to claim 4, wherein the reflector unit (1) comprises precisely two of the adjusting screws (5a, 5b).

17. The reflector unit (1) according to claim 5, wherein the engaging portions (6a, 6b, 7a, 7b) are positioned on opposing sides of the frame structure (3).

* * * * *